(12) United States Patent  
Gupta et al.

(10) Patent No.: US 10,396,033 B1
(45) Date of Patent: Aug. 27, 2019

(54) FIRST POWER BUSES AND SECOND POWER BUSES EXTENDING IN A FIRST DIRECTION

(71) Applicant: QUALCOMM Incorporated, San Diego, CA (US)

(72) Inventors: Paras Gupta, San Diego, CA (US); Aklesh Jain, San Diego, CA (US); Kelageri Nagaraj, San Diego, CA (US); V Karthik Venkataraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/042,937

(22) Filed: Jul. 23, 2018

(51) Int. Cl.
*H01L 23/528* (2006.01)
*H03K 17/687* (2006.01)

(52) U.S. Cl.
CPC ....... *H01L 23/5286* (2013.01); *H03K 17/687* (2013.01); *H03K 2217/0081* (2013.01)

(58) Field of Classification Search
USPC ................................................ 327/108–112
See application file for complete search history.

(56) References Cited

U.S. PATENT DOCUMENTS

| | | | | |
|---|---|---|---|---|
| 4,162,525 A * | 7/1979 | Epp | ................... | H02M 7/53832 307/148 |
| 5,365,355 A * | 11/1994 | Hastings | ........... | G02F 1/133512 349/110 |
| 6,308,307 B1 * | 10/2001 | Cano | ................... | G06F 17/5068 257/207 |
| 8,358,526 B2 * | 1/2013 | Shepard | .................... | G11C 5/14 365/185.05 |
| 2008/0100135 A1 * | 5/2008 | Lazarovich | ............... | H02J 5/00 307/9.1 |
| 2009/0079058 A1 * | 3/2009 | Conn | ...................... | H01L 24/29 257/691 |
| 2011/0032786 A1 * | 2/2011 | Yang | ........................ | G11C 8/08 365/230.06 |
| 2011/0148353 A1 * | 6/2011 | King | ........................ | B60L 7/12 320/109 |
| 2014/0110787 A1 * | 4/2014 | Wen | ....................... | H01L 27/088 257/368 |
| 2015/0179628 A1 * | 6/2015 | Ko | ........................ | H01L 23/585 257/491 |
| 2015/0332980 A1 * | 11/2015 | Leal | .................... | H01L 23/5256 257/530 |

(Continued)

*Primary Examiner* — Adam D Houston
(74) *Attorney, Agent, or Firm* — Qualcomm Incorporated

(57) ABSTRACT

Methods and apparatuses for efficiently providing supply voltages to a load circuit are provided. The apparatus includes a first plurality of first power buses extending in a first direction and within a first range. The first range extends in a second direction. A second plurality of first power buses extends in the first direction and within the first range. The first plurality of first power buses and the second plurality of first power buses are powered at a first supply voltage. A plurality of second power buses extends in the first direction within the first range and a second range. The second range extends in the first direction. The plurality of second power buses is powered at a second supply voltage. The first plurality of first power buses, the second plurality of first power buses, and the plurality of second power buses are in a conductive layer.

23 Claims, 7 Drawing Sheets

(56) References Cited

U.S. PATENT DOCUMENTS

| | | | |
|---|---|---|---|
| 2015/0365077 A1* | 12/2015 | Onda | G11C 5/025 |
| | | | 327/108 |
| 2016/0043072 A1* | 2/2016 | Vielemeyer | H01L 27/0629 |
| | | | 327/109 |
| 2016/0065208 A1* | 3/2016 | Moriya | H03K 17/6871 |
| | | | 318/696 |
| 2016/0325547 A1* | 11/2016 | White | B41J 2/3351 |
| 2016/0379928 A1* | 12/2016 | Christensen | H01L 23/50 |
| | | | 327/109 |
| 2017/0294502 A1* | 10/2017 | Ka | H01L 27/3248 |
| 2018/0180665 A1* | 6/2018 | Delacruz | G01R 31/2856 |
| 2018/0192539 A1* | 7/2018 | Sakalkar | H05K 7/1492 |
| 2018/0308636 A1* | 10/2018 | de Rochemont | H01G 4/1227 |

* cited by examiner

FIRST POWER BUSES AND SECOND POWER BUSES EXTENDING IN A FIRST DIRECTION

BACKGROUND

Field

The present disclosure relates generally to methods and apparatuses each incorporating a semiconductor die having first power buses and second power buses and more particularly, methods and apparatuses each incorporating the first power buses and the second power buses extending in a first direction.

Background

A computing device (e.g., a laptop, a mobile phone, etc.) may include a processor on one or more semiconductor dies to perform various functions, such as telephony, internet access, camera/video function, etc. The processor may include various circuit blocks to perform those functions. In terms of power delivery and power consumption, those circuit blocks may be referred to circuit loads, as the circuit blocks draw power while in operation. The circuit loads may be powered by power sources, such as batteries and wall plug-ins, via power/voltage regulating circuits. For example, the power/voltage regulating circuits may be power management integrated circuits (PMICs) configured to provide regulated or controlled voltages to the circuit loads.

A processor may include various power buses to route supply voltages to the load circuits on the semiconductor die or dies. The supply voltages may be low or high voltages. For example, the supply voltages may be low voltages such as ground or VSS. The high voltages may be VDD. The power/voltage regulating circuits, being external to the processor (e.g., external to the semiconductor die or dies), may be referred to as external voltage supplies that provide the high supply voltage to the load circuits via the power buses. External ground pins or ground connections may likewise be referred to external voltage supplies that provide the low supply voltage (ground or VSS) to the load circuits via the power buses.

As the computing device grows in functions and shrinks in physical dimension, efficient delivery of the supply voltages to the load circuits become increasingly challenging. The power buses conducting the supply voltages are usually top-most conductive layer routings. A conductive layer may be, for example, a metal layer. The top-most metal layer may provide the lowest resistance routing, compared to other metal layers. By routing the power buses in the top-most metal layer, valuable tracks of the top-most metal layer would be consumed and not available for other uses (e.g. high-speed signal routing).

SUMMARY

This summary identifies features of some example aspects and is not an exclusive or exhaustive description of the disclosed subject matter. Additional features and aspects are described and will become apparent to persons skilled in the art upon reading the following detailed description and viewing the drawings that form a part thereof.

An apparatus in accordance with at least one embodiment includes a first plurality of first power buses extending in a first direction and within a first range. The first range extends in a second direction. A second plurality of first power buses extends in the first direction and within the first range. The first plurality of first power buses and the second plurality of first power buses are powered at a first supply voltage. A plurality of second power buses extends in the first direction within the first range and a second range. The second range extends in the first direction. The plurality of second power buses is powered at a second supply voltage. The first plurality of first power buses, the second plurality of first power buses, and the plurality of second power buses are in a conductive layer. The plurality of second power buses is between the first plurality of first power buses and the second plurality of first power buses, in the first direction.

Aspects of a method to provide supply voltages to a load circuit, in accordance with at least one embodiment, are presented. The method includes conducting a first supply voltage by a first plurality of first power buses extending in a first direction and within a first range, the first range extending in a second direction. The method further includes conducting the first supply voltage by a second plurality of first power buses extending in the first direction and within the first range and conducting a second supply voltage by a plurality of second power buses extending in the first direction within the first range and a second range. The second range extending in the first direction. The first plurality of first power buses, the second plurality of first power buses, and the plurality of second power buses are in a conductive layer. The plurality of second power buses is between the first plurality of first power buses and the second plurality of first power buses, in the first direction.

BRIEF DESCRIPTION OF THE DRAWINGS

Various aspects of apparatus and methods will now be presented in the detailed description by way of example, and not by way of limitation, with reference to the accompanying drawings, wherein.

DETAILED DESCRIPTION

Figure 1:
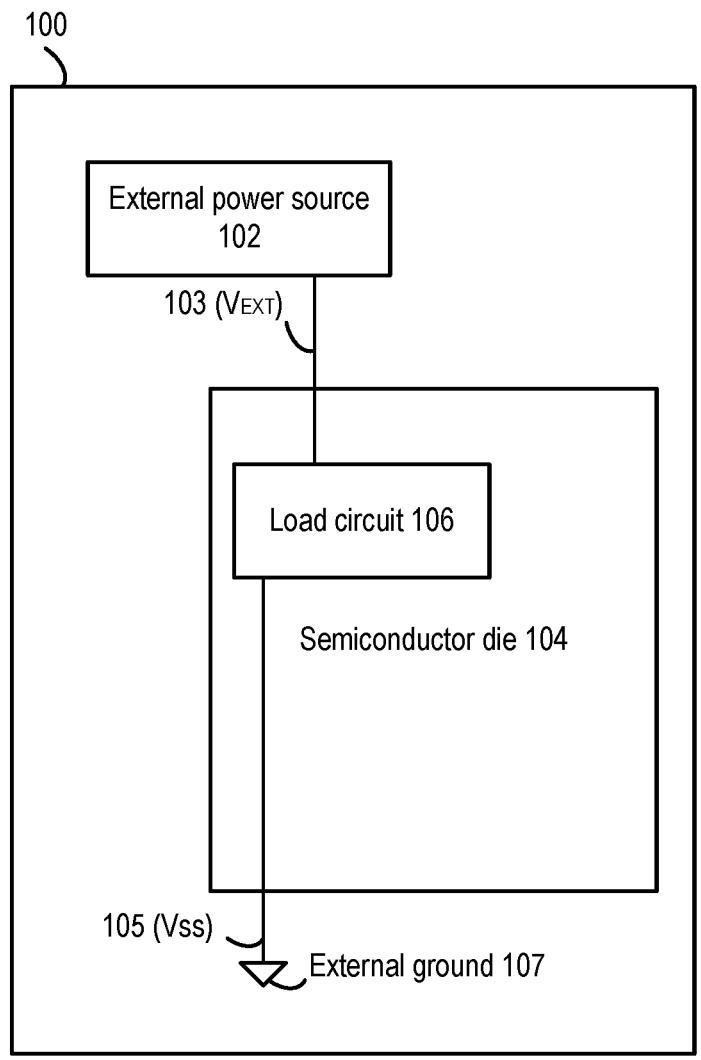
FIG. 1 is a diagram of components of an apparatus in accordance with certain aspects of the disclosure.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well known structures and components are shown in block diagram form to avoid obscuring such concepts.

As used herein, the term "coupled to" in the various tenses of the verb "couple" may mean that element A is directly connected to element B or that other elements may be connected between elements A and B (i.e., that element A is indirectly connected with element B). In the case of electrical components, the term "coupled to" may also be used herein to mean that a wire, trace, or other electrically conductive material is used to electrically connect elements A and B (and any components electrically connected therebetween). In some examples, the term "coupled to" indicate having an electric current flowing between the elements A and B. In some examples, the term "electrically connected" indicate having an electric current flowing between the elements A and B.

The terms "first," "second," "third," etc. are employed for ease of reference and may not carry substantive meanings. Within this disclosure, for example, a first power bus and a second power bus may refer to two different physical routings of power buses. The first power bus and the second power bus may thus be electrically connected or not electrically connected. The first power bus and the second power bus may conduct a same supply voltage, different supply voltages, or no supply voltages.

Methods and apparatuses to efficient power bus routing are presented. For example, a first plurality of first power buses and a second plurality of first power buses extend in a first direction on a semiconductor die of a processor. The first plurality of first power buses and the second plurality of first power buses are powered at a first supply voltage (e.g., high supply voltage or VSS). A plurality of second power bus also extends in the first direction and is powered at a second supply voltage different from the first supply voltage. The plurality of second power buses lies between the first plurality of first power buses and the second plurality of first power buses, in reference to the first direction. For example, in the first direction, routings are in the sequence of the first plurality of first power buses (powered at the first supply voltage), the plurality of second power buses (powered at the second supply voltage), and the second plurality of first power buses (powered at the first supply voltage).

By breaking up power buses for the first supply voltage into the first plurality of first power buses and the second plurality of first power buses, and/or inserting the plurality of second power buses between the plurality of first power buses and the second plurality of first power buses, usage of tracks (e.g., channels) running in the first direction are reduced. Moreover, power routing efficiency may be improved by routing a second plurality of second power buses (powered at the second supply voltage), thereby reduces voltage drops experienced at the load circuits.

FIG. 1 is a diagram of components of an apparatus in accordance with certain aspects of the disclosure. The apparatus 100 may, for example, be one of a computing system (e.g., servers, datacenters, desktop computers), mobile computing device (e.g., laptops, cell phones, vehicles, etc.), Internet of Things device, and virtual reality or augmented reality system. The apparatus 100 includes an external power source 102, a high voltage supply connection 103, a semiconductor die 104, a ground connection 105, and an external ground 107.

The semiconductor die 104 may be, for example, a processor or part of a processor. The semiconductor die 104 includes a load circuit 106 to perform various functions (e.g., computing, image-capture, communication, etc.) of the processor for the apparatus 100. The external power source 102 may be, for example, a PMIC. The external power source 102 may configured to provide a supply voltage to the load circuit 106 on the semiconductor die 104, via the high voltage supply connection 103. Supply voltages to operate the load circuit 106 may be high voltage (e.g., VDD) or low voltage (e.g. VSS or ground). The load circuits may utilize the supply voltages to operation functions for the apparatus 100.

In FIG. 1, the external power source 102 provides an external high voltage (VEXT) onto the high voltage supply connection 103, as a first supply voltage, to power the load circuit 106. The external ground 107 may be a pin or part of a power delivery network in a package to provide grounding of the load circuit 106. The external ground 107 provides VSS (ground), as a second supply voltage, to power the load circuit 106. The first supply voltage (e.g., VEXT) and the second supply voltage VSS may be provided to the load circuit 106 via various power switches on the semiconductor die 104. Examples of the power switches are presented with FIG. 2.

Figure 2:
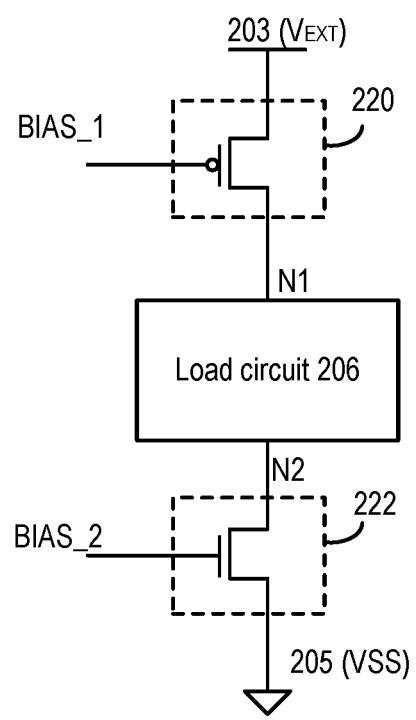
FIG. 2 is a diagram of power switches providing supply voltages to a load circuit on the semiconductor die of FIG. 1.

FIG. 2 is a diagram of power switches providing supply voltages to a load circuit on the semiconductor die of FIG. 1. FIG. 2 illustrates an instance of the semiconductor die 104 of FIG. 1 and includes a high voltage supply connection 203, a ground connection 205, a load circuit 206, and power switches 220 and 222. The high voltage supply connection 203 may be an instance of the high voltage supply connection 103 (FIG. 1). The ground connection 205 may be an instance of the ground connection 107 (FIG. 1). The load circuit 206 may in an instance of the load circuit 106 (FIG. 1).

The high voltage supply connection 203 may provide a first supply voltage (e.g., VEXT) to load circuit 206 via the power switch 220. The ground connection 205 may provide a second supply voltage (e.g., VSS) to the load circuit 206 via the power switch 222. In some examples, the power switches 220 and 222 may be ON-OFF switches. For example, the power switches 220 and 222 may be global distributed head-switches (for ease of reference, a head-switch may be inclusive of a foot-switch). In some examples, the power switches 220 and 222 may provide regulated voltages (e.g., being drivers of voltage regulators).

In FIG. 2, the power switch 220 includes a p-type metal-oxide-semiconductor (MOS) transistor operating as a head-switch to the load circuit 206. The power switch 220 is biased by a BIAS_1 signaling (e.g., a conductor carrying the BIAS_1 signal). The BIAS_1 signaling operates to turn the power switch 220 on and off. When turned on, the power switch 220 provides the first supply voltage (e.g., VEXT) on the high voltage supply connection 203 to a node N1 of the load circuit 206. In some examples, the BIAS_1 signaling may be a regulated voltage to control a voltage at the node N1.

The power switch 222 includes a n-type MOS transistor operating as a foot-switch to the load circuit 207. The power switch 222 is biased by a BIAS_2 signaling (e.g., a conductor carrying the BIAS_2 signal). The BIAS_2 signaling operates to turn the power switch 220 on and off. When turned on, the power switch 222 provides the second supply voltage (e.g., VSS) on the ground connection 205 to a node N2 of the load circuit 206 (e.g., discharges the node N2). In some examples, the BIAS_2 signaling may be a regulated voltage to control a voltage at the node N2. The nodes N1 and N2 may be referred to as internal power buses.

Figure 3:
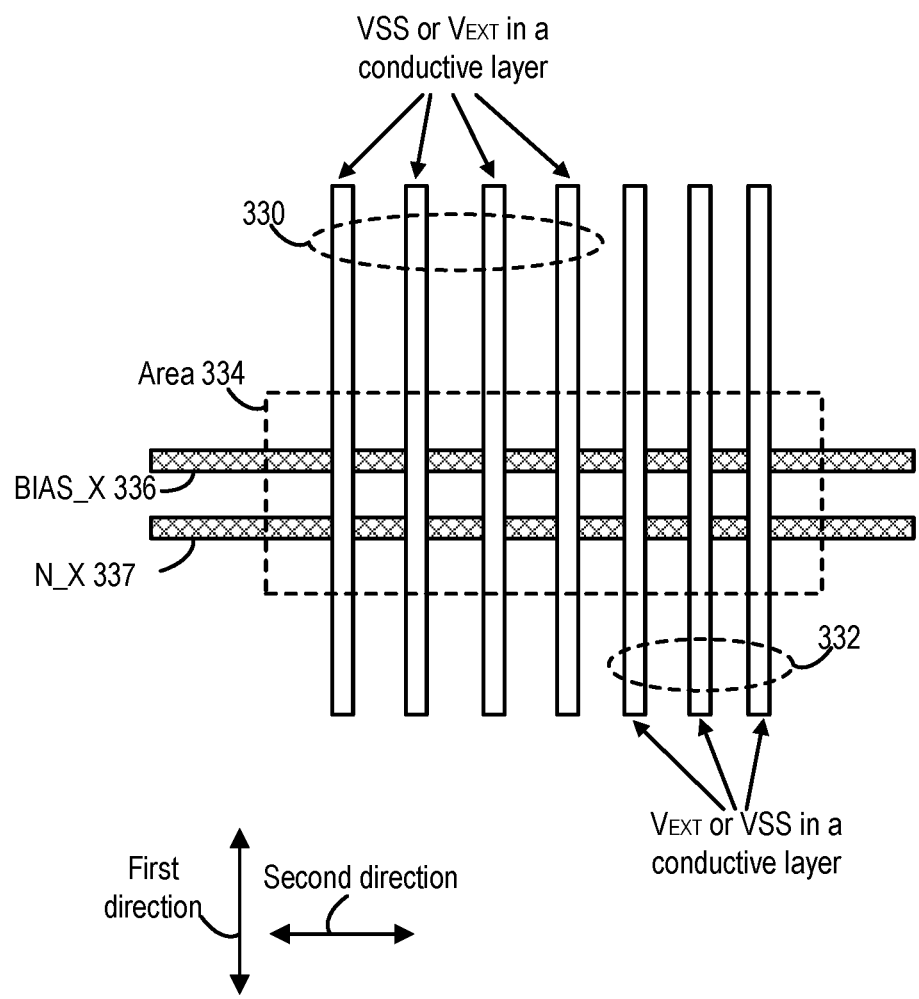
FIG. 3 is a diagram of power bus routing on the semiconductor die of FIG. 1.

FIG. 3 is a diagram of power bus routing on the semiconductor die of FIG. 1. FIG. 3 is an overhead view (e.g., from top looking down at the semiconductor die 104 of FIG. 1) of a physical implementation (e.g., power bus routings) of the high voltage supply connection (e.g., high voltage supply connection 103 of FIG. 1 or high voltage supply connection 203 of FIG. 2), and a physical implementation (e.g., power bus routings) of a ground connection (e.g., ground connection 105 of FIG. 1 or the ground connection 205 of FIG. 2). FIG. 3 includes a plurality of first power buses 330 and a plurality of second power buses 332. Both the plurality of first power buses 330 and the plurality of second power buses 332 extend in a first direction and are in a same conductive layer (e.g., a metal layer). For example, the plurality of first power buses 330 and the plurality of second power buses 332 may be topmost metal layer lines.

The plurality of first power buses 330 may be part of a ground connection (e.g., ground connection 105 of FIG. 1 or ground connection 205 of FIG. 2) or a high supply voltage connection (e.g., high voltage supply connection 103 of FIG. 1 or high voltage supply connection 203 of FIG. 2). The plurality of second power buses 332 may be part of the high supply voltage connection or the ground connection. The BIAS_X signaling 336 extends in the second direction and is in a second conductive layer different from the topmost metal layer. In other words, the BIAS_X signaling 336 is in the metal layer different from the first plurality of first power buses 330 and the plurality of second power buses 332. The BIAS_X signaling 336 may be an instance of the BIAS_1 signaling or the BIAS_2 signaling of FIG. 2.

The area 334 denotes an area on the semiconductor die 104 (FIG. 1) within which the power switch 220 or 222 (FIG. 2) may, at least in part, be located. The BIAS_X signaling 336 biases the power switch 220 or 222 (FIG. 2) that is located within the area 334. The power bus N_X 337 extends in the second direction and is in the second conductive layer. The power bus N_X 337 may be an instance of the node N1 or the node N2 of FIG. 2. The power switch 220 or 222 (FIG. 2) within the area 334 may operate to electrically connect the plurality of first power buses 330 (or the plurality of second power buses 332) to the power bus N_X 337, controlled by the BIAS_X signaling 336.

As illustrated in FIG. 3, the first plurality of first power buses 330 and the plurality of second power buses 332 may consume significant tracks of the topmost metal layer extending in the first direction over the are 334. Such tracks of the topmost metal layer are valuable, as the topmost metal layer is usually the lowest resistive of all metal layers of the semiconductor die 104 (FIG. 1). The present disclosure provides methods and apparatus to reduce such consumption and to improve efficiency of delivering supply voltages.

Figure 4:
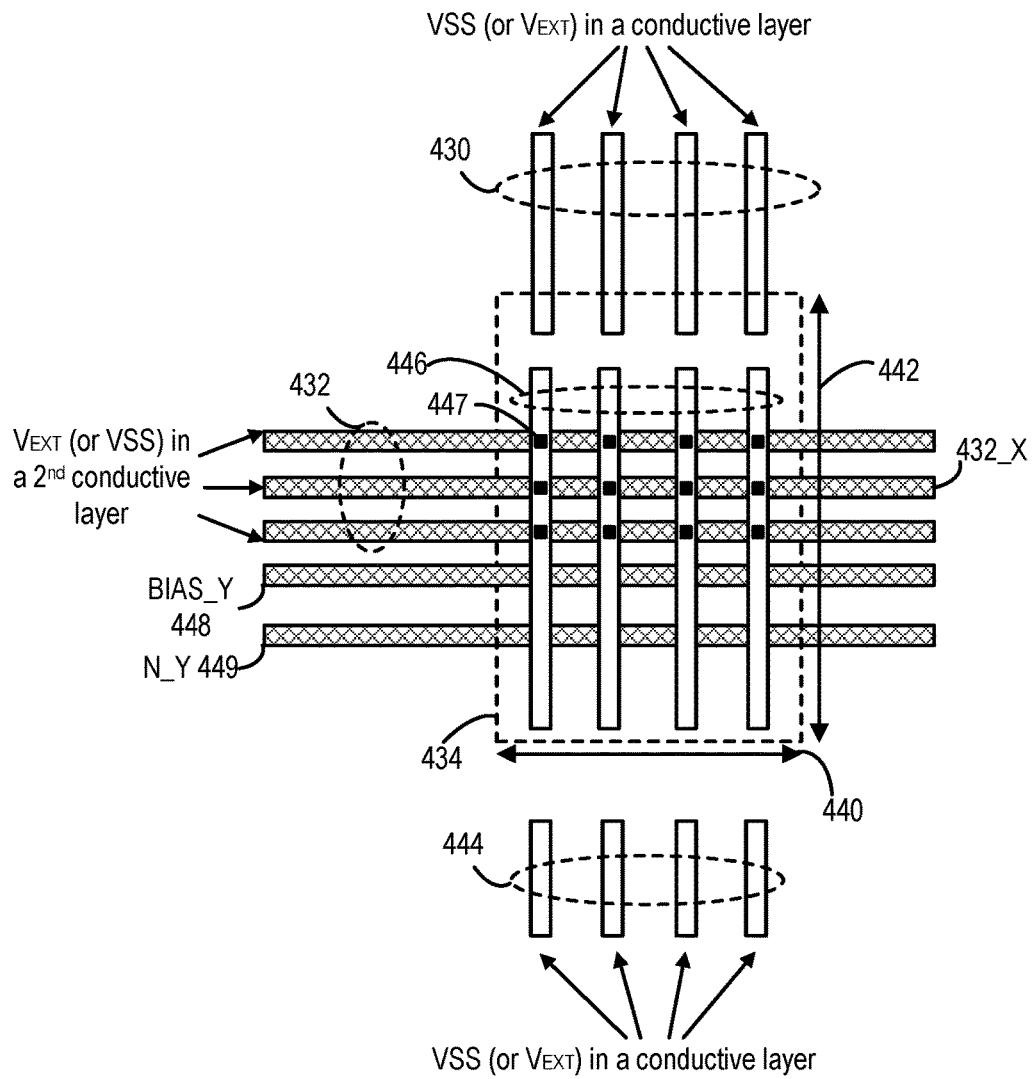
FIG. 4 is another diagram of power bus routing on the semiconductor die of FIG. 1, in accordance with certain aspects of the disclosure.

FIG. 4 is another diagram of power bus routing on the semiconductor die of FIG. 1, in accordance with certain aspects of the disclosure. FIG. 4 is an overhead view (e.g., from top looking down at the semiconductor die 104 of FIG. 1) of a physical implementation (e.g., power bus routings) of a high voltage supply connection (e.g., high voltage supply connection 103 of FIG. 1 or high voltage supply connection 203 of FIG. 2) and a physical implementation (e.g., power bus routings) of a ground connection (e.g., ground connection 105 of FIG. 1 or ground connection 205 of FIG. 2). A plane having a first direction and a second direction may correspond to a surface of the semiconductor die 104 of FIG. 1.

FIG. 4 includes a first plurality of first power buses 430, a second plurality of first power buses 444, a plurality of second power buses 446, a second plurality of second power buses 432, an area 434 on the semiconductor die 104 (FIG. 1), a contact 447, a BIAS_Y signaling 448, and a third power bus N_Y 449.

The area 434 denotes an area on the semiconductor die 104 (FIG. 1) within which the power switch 220 or 222 (FIG. 2) may, at least in part, be located. The area 434 has a first range 440 (e.g., a first distance or a first width) extending in a second direction and a second range 442 (e.g., a second distance or a second width) extending in a first direction. The first plurality of first power buses 430 extends in the first direction and is within the first range 440. The second plurality of first power buses 444 extends in the first direction and is within the first range 440. The first plurality of first power buses 430 and the second plurality of first power buses 444 are powered at a first supply voltage. In some example, the first plurality of first power buses 430 and the second plurality of first power buses 444 may be powered by the external power source 102 (FIG. 1) to conduct a high supply voltage VEXT. In some examples, the first plurality of first power buses 430 and the second plurality of first power buses 444 may be powered by the external ground 107 (FIG. 1) to conduct a low supply voltage VSS.

The plurality of second power buses 446 extends in the first direction within the first range 440 and the second range 442 (e.g., within the area 434). The plurality of second power buses 446 is powered at a second supply voltage. In some examples, the plurality of second power buses 446 be powered by the external power source 102 (FIG. 1) to conduct a high supply voltage VEXT. In some examples, the plurality of second power buses 446 may be powered by the external ground 107 (FIG. 1) to conduct a low supply voltage VSS. For FIG. 4, in some examples, the first supply voltage may be high voltage (e.g., external high voltage VEXT), and second supply voltage may be low voltage (e.g., VSS). In some examples, the first supply voltage may be low voltage (e.g., VSS), and the second supply voltage may be high voltage (e.g., external high voltage VEXT).

The first plurality of first power buses 430, the second plurality of first power buses 444, and the plurality of second power buses 446 are in a conductive layer (e.g., a topmost metal layer). The plurality of second power buses 446 are between the first plurality of first power buses 430 and the second plurality of first power buses 444, in the first direction. For example, along the first direction, the first plurality of first power buses 430 is at top. The plurality of second power buses 446 is in the middle, and the second plurality of first power buses 444 is at bottom.

The second plurality of second power buses 432 extends in the second direction, within the second range 442. The second plurality of second power buses 432 is in a second conductive layer (e.g., in a metal layer that is not the topmost metal layer). The contact 447 (e.g., at least one contact) is within the first range 440 and the second range 442 (e.g., within the area 434). In some examples, the contact 447 may be a vertical connection between the conductive layer and the second conductive layer. The contact 447 may be known as either contact or via. The contact 447 electrically connects the plurality of second power buses 446 and the second plurality of second power buses 432. A power switch (e.g., the power switch 220 or 222 of FIG. 2; not shown in FIG. 4) is, at least in part, within the first range and the second range (e.g., within the area 434).

The first plurality of first power buses 430 and the second plurality of first power buses 444 may be on same tracks. For example, each metal/conductive line of the first plurality of first power buses 430 may be aligned with each metal/ conductive line of the second plurality of first power buses 444. The plurality of second power buses 446 may be on the same tracks as the first plurality of first power buses 430 and the second plurality of first power buses 444 in similar fashion. In some examples, all the metal/conductive lines of the first plurality of first power buses 430, the plurality of second power buses 446, and the second plurality of first power buses 444 may start out as a same set of metal/conductive lines. The metal/conductive lines may then be cut to form the different power buses on the same tracks.

The third power bus N_Y 449 extends in the second direction. The third power bus N_Y 449 may be in instance of the node N1 or the node N2 (FIG. 2) and may be in the second conductive layer. The BIAS_Y signaling 448 extends in the second direction. The BIAS_Y signaling 448 may be an instance of the BIAS_1 signaling or the BIAS_2 signaling (FIG. 2) and may be in the second conductive layer. The third power bus N_Y 449 or the BIAS_Y signaling 448 may be within the second range 442 or within the area 434. In some examples, the first plurality of first power buses 430, the second plurality of first power buses 444, or the plurality of second power buses 446 may be electrically connected to the third power bus N_Y 449 via the power switch 220 or 222 of FIG. 2 and controlled by the BIAS_Y signaling 448. For example, the first plurality of first power buses 430 and the second plurality of first power buses 444 may conduct the low supply voltage VSS, and the plurality of second power buses 446 may conduct the high supply voltage VEXT.

In some example, the power switch 220 (FIG. 2) may be within the area 434, and the third power bus N_Y 449 may be an instance of the node N1 (FIG. 2). The plurality of second power buses 446 may be an instance of the high voltage supply connection 203 and be electrically connected to the third power bus N_Y 449 via the power switch 220. The bias signaling BIAS_Y 448 may be an instance of the bias signaling BIAS_1 (FIG. 2) and configured to bias the power switch 220 to adjust an electrical connection of the plurality of second power buses 446 to the third power bus N_Y 449 via the power switch 220. For example, the bias signaling BIAS_Y 448 may turn the power switch 220 on and off, or to limit a current or voltage drop across the power switch 220.

In some example, the power switch 222 (FIG. 2) may be within the area 434, and the third power bus N_Y 449 may be an instance of the node N2 (FIG. 2). The first plurality of first power buses 430 and/or the second plurality of first power buses 444 may be an instance of the ground connection 205 and be electrically connected to the third power bus N_Y 449 via the power switch 222. The bias signaling BIAS_Y 448 may be an instance of the bias signaling BIAS_2 (FIG. 2) and configured to bias the power switch 222 to adjust an electrical connection of the first plurality of first power buses 430 or the second plurality of first power buses 444 to the third power bus N_Y 449 via the power switch 222. For example, the bias signaling BIAS_Y 448 may turn the power switch 222 on and off, or to limit a current or voltage drop across the power switch 222.

Referring to FIG. 1, the apparatus 100 may include an external power source, such as the external power source 102 or the external ground 107 to power the first plurality of first power buses 430, the second plurality of first power buses 444, or the plurality of second power buses 436. For example, the external ground 107 may be electrically connected to one or both of the first plurality of first power buses 430 and the second plurality of first power buses 444. The external power source 102 may be electrically connected to the second plurality of the second power buses 432 and to the plurality of second power buses 436 via the second plurality of the second power buses 432 and the contact 447. Alternatively, external power source 102 may be electrically connected to one or both of the first plurality of first power buses 430 and the second plurality of first power buses 444. The external ground 107 may be electrically connected to the second plurality of the second power buses 432 and to the plurality of second power buses 436 via the second plurality of the second power buses 432 and the contact 447.

Figure 5:
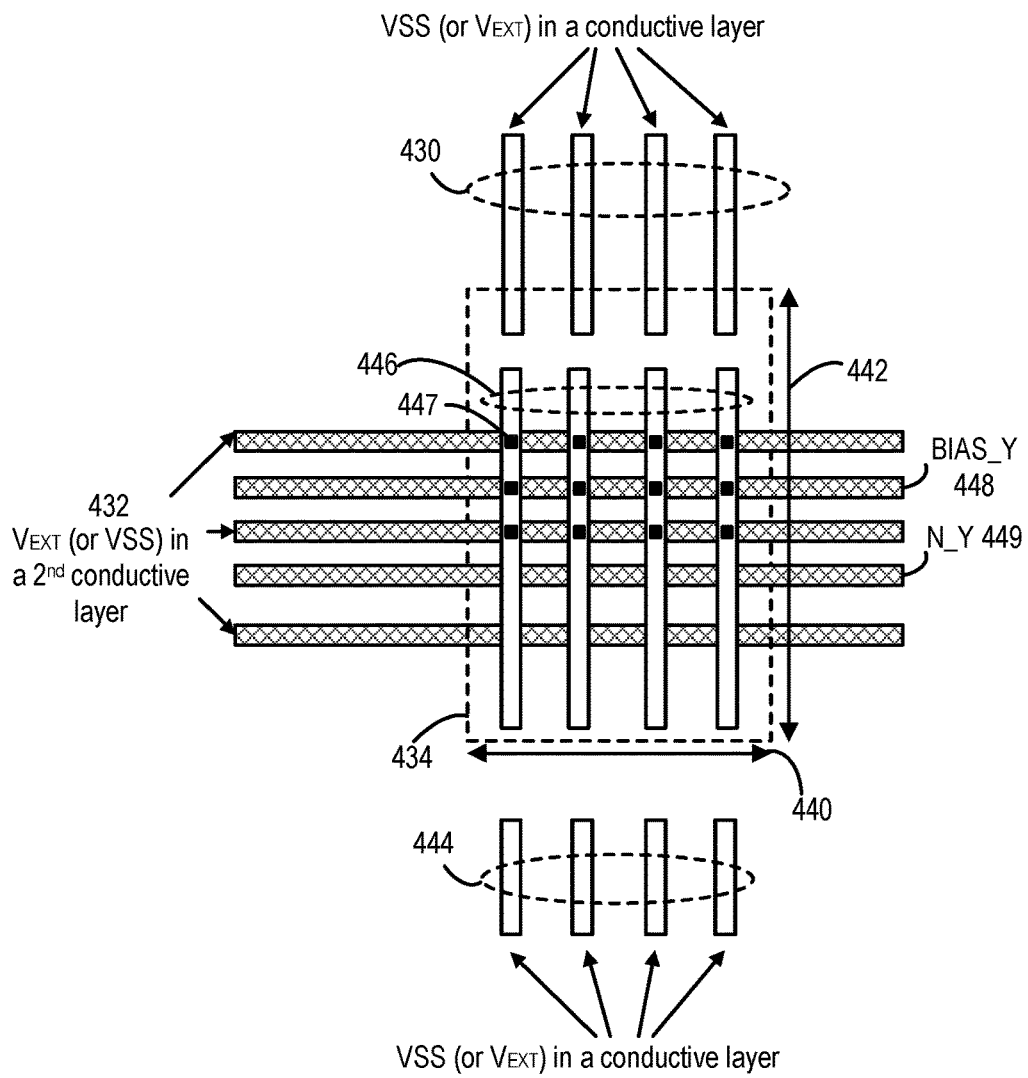
FIG. 5 is a is a diagram of another configuration of power bus routing of FIG. 4, in accordance with certain aspects of the disclosure.

FIG. 5 is a diagram of another configuration of power bus routing of FIG. 4, in accordance with certain aspects of the disclosure. FIG. 5 illustrates include the first plurality of first power buses 430, the second plurality of second power buses 432, the area 434 on the semiconductor die 104 (FIG. 1), the second plurality of first power buses 444, the plurality of second power buses 446, the contact 447, the BIAS_Y signaling 448, and the third power bus N_Y 449 presented with FIG. 4. FIG. 5 illustrates that the second plurality of second power buses 432 sandwiches the BIAS_Y signaling 448 and/or the third power bus N_Y 449.

Figure 6:
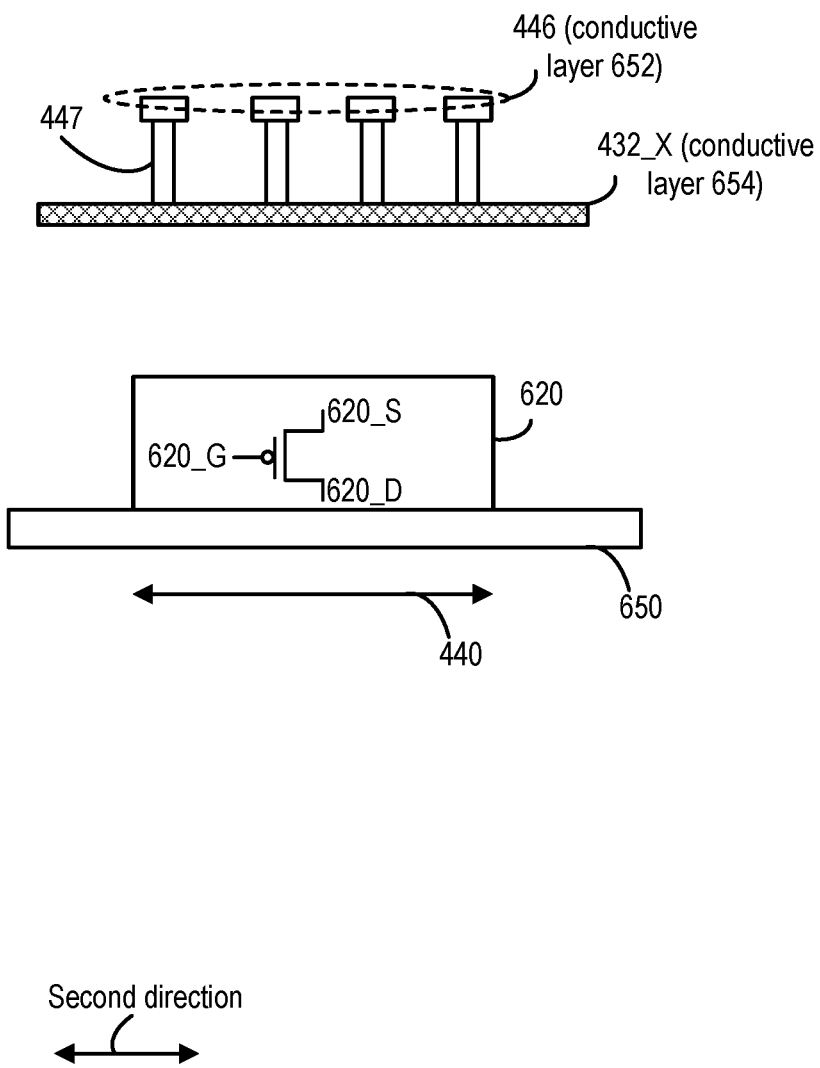
FIG. 6 is a cross-sectional view of the conductive layers of the power bus routing of FIG. 4.

FIG. 6 is a diagram of a cross-sectional view of the conductive layers of the power bus routing of FIG. 4. FIG. 6 may illustrate the cross-sectional view along 432_X of FIG. 4. FIG. 6 includes the plurality of second power buses 446 (FIG. 4), the second plurality of second power buses 432 (FIG. 4), the contact 447 (FIG. 4), a power switch 620, a substrate 650. In FIG. 6, the first direction would be into the page, for a viewer perspective.

The plurality of second power buses 446 (FIG. 4) is in a topmost conductive (e.g., metal) layer 652. The second plurality of second power buses 432 (FIG. 4) is in a second conductive layer 654 below the topmost conductive layer 652. The plurality of second power buses 446 (FIG. 4) and the second plurality of second power buses 432 (FIG. 4) are electrically connected by the contact 447 (FIG. 4). Contacts within the disclosure may include vertical interconnects known as vias.

The power switch 620 is disposed below the topmost conductive layer 652 and the second conductive layer 654 and on the substrate 650. The power switch 620 may be within the first range 440 extending in the second direction. The power switch 620 may be implemented in various semiconductor technologies. For example, the power switch 620 may planar or FinFET semiconductor device or devices. As an example, the power switch 620 may include a p-type MOS device having a gate 620_G, a source 620_S, and a drain 620_D. The power switch 620 may be in instance of the power switch 220 (FIG. 2). In some example, the gate 620_G may be electrically connected to the bias signaling BIAS_Y 442 (FIG. 4). The source 620_S may be electrically connected to plurality of second power buses 446 (FIG. 4) and/or the second plurality of second power buses 432 (FIG. 4). The drain 620_D may be electrically connected to the third power bus N_Y 449 (FIG. 4).

Referring to FIG. 4, the first plurality of first power buses 430 and the second plurality of first power buses 444 may be in the topmost conductive layer 652, as illustrated by the plurality of second power buses 446 in FIG. 6. The bias signaling BIAS_Y 448 and the third power bus N_Y 449 may be in the second conductive layer 654, as illustrated by the second plurality of second power buses 432_X as illustrated in FIG. 6.

Figure 7:
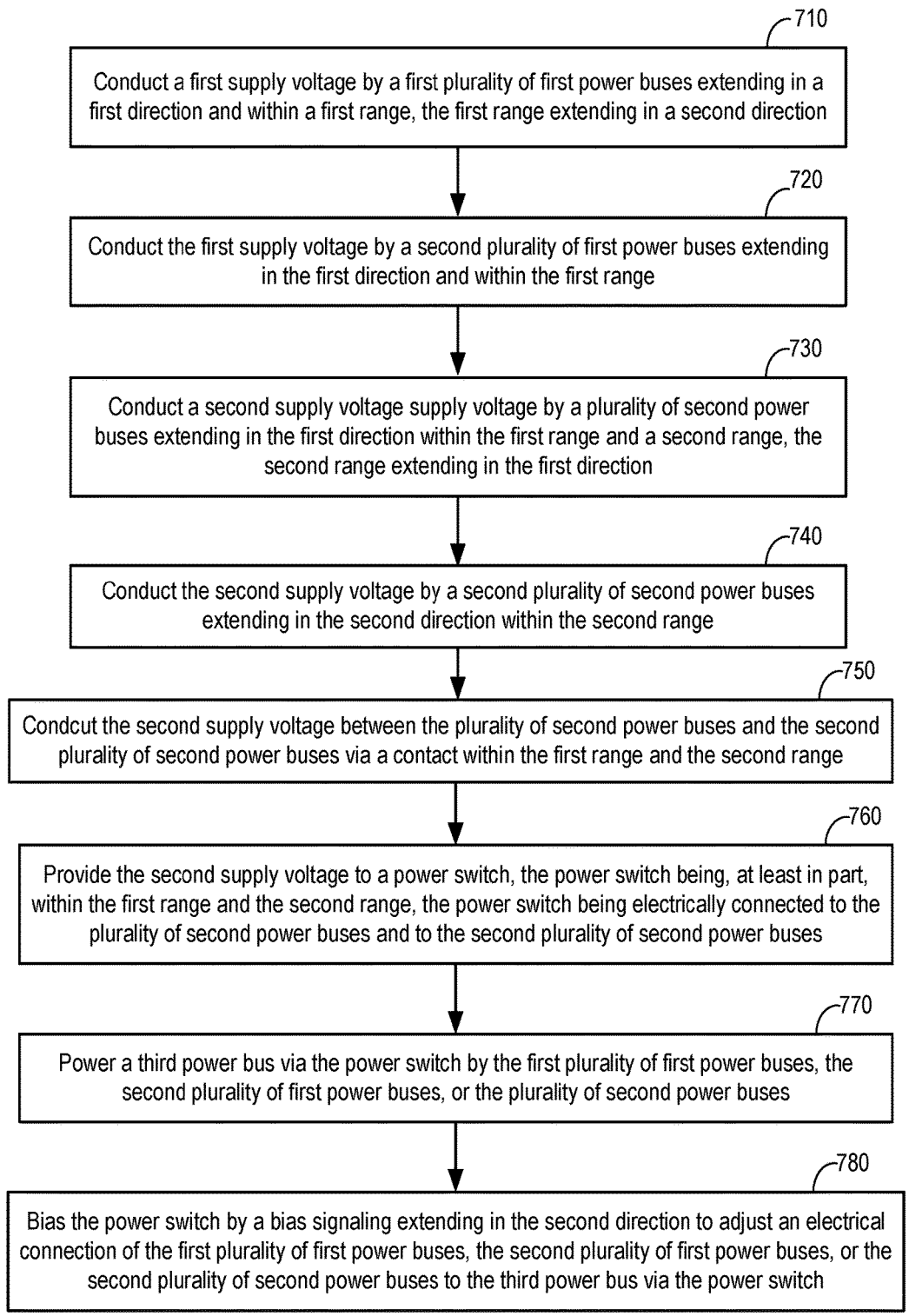
FIG. 7 is a flowchart of a method to conduct supply voltages, in accordance with certain aspects of the disclosure.

FIG. 7 is a method to conduct supply voltages, in accordance with certain aspects of the disclosure. The operations of FIG. 7 may be implemented by, for example, the apparatus 100 presented with FIGS. 1, 2, 4, 5, and/or 6. The arrows indicate certain relationships among the operations, but not necessarily sequential relationships.

At 710, a first supply voltage is conducted by a first plurality of first power buses extending in a first direction and within a first range, the first range extending in a second direction. Referring to FIG. 4, VSS (the first supply voltage) is conducted by the first plurality of first power buses 430 extending in the first direction and within the first range 440. The first range 440 may extend in the second direction.

At 720, the first supply voltage is conducted by a second plurality of first power buses extending in the first direction and within the first range. Referring to FIG. 4, VSS (the first supply voltage) is conducted by the second plurality of first power buses 444 extending in the first direction and within the first range 440. In some examples, the first plurality of first power buses 430 may be electrically connected to the second plurality of first power buses 444.

At 730, a second supply voltage is conducted by a plurality of second power buses extending in the first direction within the first range and a second range, the second range extending in the first direction. Referring to FIG. 4, VEXT (the second supply voltage) is conducted by the plurality of second power buses 446 extending in the first direction within the first range 440 and a second range 442. In some examples, the first plurality of first power buses 430, the second plurality of first power buses 444, and the plurality of second power buses 446 are in a conductive layer 652 (FIG. 6). The plurality of second power buses 446 may be between the first plurality of first power buses 430 and the second plurality of first power buses 444 in, the first direction.

At 740, the second supply voltage is conducted by a second plurality of second power buses extending in the second direction within the second range. The second plurality of second power buses is in a second conductive layer. Referring to FIG. 4, VEXT (the second supply voltage) is conducted by the second plurality of second power buses 432 extending in the second direction within the second range 442. Referring to FIG. 6, the second plurality of second power buses 432 may be in the second conductive layer 654 below the conductive layer 652.

At 750, the second supply voltage is conducted between the plurality of second power buses and the second plurality of second power buses via a contact within the first range and the second range. Referring to FIG. 4, VEXT (the second supply voltage) is conducted between the plurality of second power buses 446 and the second plurality of second power buses 432 via the contact 447 within the first range 440 and the second range 442.

At 760, the second supply voltage is provided to a power switch. The power switch is, at least in part, within the first range and the second range. The power switch is electrically connected to the plurality of second power buses and to the second plurality of second power buses. Referring to FIG. 2, VEXT (the second supply voltage) is provided to the power switch 220 by the high voltage supply connection 203. The high voltage supply connection 203 is electrically connected to the power switch 220, and the plurality of second power buses 446 and to the second plurality of second power buses 432 (FIG. 4) may be instances of the high voltage supply connection 203. Referring to FIG. 4, the power switch 220 may be within the area 434 and therefore, between the first range 440 and the second range 442.

At 770, a third power bus is powered via the power switch by the first plurality of first power buses, the second plurality of first power buses, or the plurality of second power buses, the third power bus being in the second conductive layer.

Referring to FIG. 2, in some examples, the node N1 (the third power bus) is powered via the power switch 220 by the high voltage supply connection 203. Referring to FIG. 4, the third power bus N_Y 449 may be an instance of the node N1. The plurality of second power buses 446 may be an instance of the high voltage supply connection 203.

Referring to FIG. 2, in some examples, the node N2 (the third power bus) is powered via the power switch 222 by the ground connection 205. Referring to FIG. 4, the third power bus N_Y 499 may be an instance of the node N2. The first plurality of first power buses 430 and/or the second plurality of first power buses 444 may be in instance of the ground connection 205. Referring to FIG. 4, the third power bus N_Y 499 may be in the second conductive layer.

At 780, the power switch is biased by a bias signaling extending in the second direction to adjust an electrical connection of the first plurality of first power buses, the second plurality of first power buses, or the plurality of second power buses to the third power bus via the power switch. Referring to FIG. 2, in some examples, the power switch 220 is biased by a bias signaling BIAS_1 to adjust an electrical connection of the high voltage supply connection 203 and the node N1 via the power switch 220. For example, the bias signaling BIAS_1 may adjust the electrical connection between the high voltage supply connection 203 and the node N1 via the power switch 220 by turning the power switch 220 on and off or limiting a current or voltage drop across the power switch 220. Referring to FIG. 4, the Referring to FIG. 4, the third power bus N_Y 449 may be an instance of the node N1. The plurality of second power buses 446 may be an instance of the high voltage supply connection 203.

Referring to FIG. 2, in some examples, the power switch 222 is biased by a bias signaling BIAS_2 to adjust an electrical connection of the ground connection 205 and the node N2 via the power switch 222. For example, the bias signaling BIAS_2 may adjust the electrical connection between the ground connection 205 and the node N2 via the power switch 222 by turning the power switch 222 on and off or limiting a current or voltage drop across the power switch 222. Referring to FIG. 4, the Referring to FIG. 4, the third power bus N_Y 449 may be an instance of the node N2. The plurality of the first plurality of first power buses 430 or the second plurality of first power buses 444 may be an instance of the ground connection 205.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus, comprising:
    a first plurality of first power buses extending in a first direction and within a first range, the first range extending in a second direction;
    a second plurality of first power buses extending in the first direction and within the first range, the first plurality of first power buses and the second plurality of first power buses being powered at a first supply voltage;
    a plurality of second power buses extending in the first direction within the first range and a second range, the second range extending in the first direction, the plurality of second power buses being powered at a second supply voltage,
    wherein the first plurality of first power buses, the second plurality of first power buses, and the plurality of second power buses are in a conductive layer, and
    the plurality of second power buses is between the first plurality of first power buses and the second plurality of first power buses, in the first direction.

2. The apparatus of claim 1, further comprising a second plurality of second power buses extending in the second direction within the second range, wherein the second plurality of second power buses is in a second conductive layer.

3. The apparatus of claim 2, further comprising a contact within the first range and the second range, the contact electrically connects the plurality of second power buses and the second plurality of second power buses.

4. The apparatus of claim 3, further comprising a power switch, at least in part, within the first range and the second range, the power switch being electrically connected to the plurality of second power buses via the contact.

5. The apparatus of claim 4, wherein the first plurality of first power buses and the second plurality of first power buses are on same tracks.

6. The apparatus of claim 5, wherein the plurality of second power buses are on the same tracks.

7. The apparatus of claim 5, wherein the first supply voltage comprises ground and the second supply voltage comprises an external high voltage, or
    the first supply voltage comprises the external high voltage and the second supply voltage comprises ground.

8. The apparatus of claim 7, further comprising a third power bus extending in the second direction, wherein the third power bus is in the second conductive layer.

9. The apparatus of claim 8, wherein the first plurality of first power buses, the second plurality of first power buses, or the plurality of second power buses is electrically connected to the third power bus via the power switch.

10. The apparatus of claim 9, wherein the third power bus is within the second range and is sandwiched by the second plurality of second power buses.

11. The apparatus of claim 9, further comprising a bias signaling extending in the second direction, wherein a bias signaling is configured to bias the power switch to adjust an electrical connection of the first plurality of first power buses, the second plurality of first power buses, or the plurality of second power buses to the third power bus via the power switch.

12. The apparatus of claim 11, wherein the bias signaling is within the second range and is sandwiched by the second plurality of second power buses.

13. The apparatus of claim 7, further comprising one of a computing system, a mobile computing system, an Internet of Things device, and a virtual reality or augmented reality system incorporating the first plurality of first power buses, the second plurality of first power buses, the plurality of second power buses, the second plurality of second power buses, the contact, and the power switch.

14. The apparatus of claim 13, further comprising an external power source powering the first plurality of first power buses, the second plurality of first power buses, or the second plurality of second power buses.

15. A method to provide supply voltages to a load circuit, comprising:
    conducting a first supply voltage by a first plurality of first power buses extending in a first direction and within a first range, the first range extending in a second direction;
    conducting the first supply voltage by a second plurality of first power buses extending in the first direction and within the first range;
    conducting a second supply voltage by a plurality of second power buses extending in the first direction within the first range and a second range, the second range extending in the first direction,
    wherein the first plurality of first power buses, the second plurality of first power buses, and the plurality of second power buses are in a conductive layer, and
    the plurality of second power buses is between the first plurality of first power buses and the second plurality of first power buses, in the first direction.

16. The method of claim 15, further comprising:
    conducting the second supply voltage by a second plurality of second power buses extending in the second direction within the second range, wherein the second plurality of second power buses is in a second conductive layer.

17. The method of claim 16, further comprising:
    conducting the second supply voltage between the plurality of second power buses and the second plurality of second power buses via a contact within the first range and the second range.

18. The method of claim 17, further comprising:
    providing the second supply voltage to a power switch, the power switch being, at least in part, within the first range and the second range, the power switch being electrically connected to the plurality of second power buses and to the second plurality of second power buses.

19. The method of claim 18, wherein the first plurality of first power buses and the second plurality of first power buses are on same tracks.

20. The method of claim 19, wherein the plurality of second power buses are on the same tracks.

21. The method of claim 18, wherein the first supply voltage comprises ground and the second supply voltage comprises an external high voltage, or
   the first supply voltage comprises the external high voltage and the second supply voltage comprises ground.

22. The method of claim 21, further comprising:
   powering a third power bus via the power switch by the first plurality of first power buses, the second plurality of first power buses, or the plurality of second power buses, the third power bus being in the second conductive layer.

23. The method of claim 22, further comprising:
   biasing the power switch by a bias signaling extending in the second direction to adjust an electrical connection of the first plurality of first power buses, the plurality of first power buses, or the second plurality of second power buses to the third power bus via the power switch.

\* \* \* \* \*